(12) United States Patent
Mehdi et al.

(10) Patent No.: US 11,815,361 B2
(45) Date of Patent: Nov. 14, 2023

(54) SYSTEM AND METHOD FOR GENERATING AN OCCLUSION MAP USING CROWDSOURCING

(71) Applicant: GM Global Technology Operations LLC, Detroit, MI (US)

(72) Inventors: Syed Bilal Mehdi, Foster City, CA (US); Sayyed Rouhollah Jafari Tafti, Troy, MI (US); Michael Alan Losh, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 113 days.

(21) Appl. No.: 17/720,466

(22) Filed: Apr. 14, 2022

(65) Prior Publication Data

US 2023/0332919 A1    Oct. 19, 2023

(51) Int. Cl.
   *G01C 21/00*    (2006.01)
(52) U.S. Cl.
   CPC ..... *G01C 21/3833* (2020.08); *G01C 21/3815* (2020.08); *G01C 21/3826* (2020.08)
(58) Field of Classification Search
   CPC ............ G01C 21/3833; G01C 21/3815; G01C 21/3826

USPC ........................................................ 701/409
See application file for complete search history.

(56) References Cited

U.S. PATENT DOCUMENTS

| | | | |
|---|---|---|---|
| 2019/0101649 A1* | 4/2019 | Jensen | G05D 1/0257 |
| 2019/0138823 A1* | 5/2019 | Doria | G06V 20/588 |
| 2021/0041883 A1* | 2/2021 | Bansal | G06T 7/74 |

* cited by examiner

Primary Examiner — Isaac G Smith
(74) *Attorney, Agent, or Firm* — Vivacqua Crane PLLC

(57) ABSTRACT

A method for generating an occlusion map using crowdsourcing includes receiving occlusion data from a host vehicle. The occlusion data includes a plurality of virtual detection lines each extending from the sensor and intersecting an off-road area. The method further includes marking all non-occluded points that are located inside the off-road area and that are located within a predetermined distance from each plurality of virtual detection lines. The method further includes determining a non-occluded region inside the off-road area using the non-occluded points that have been previously marked inside the off-road area, wherein the non-occluded region is part of non-occlusion data. The method further includes generating an occlusion map using the non-occlusion data. The method further includes transmitting the occlusion map to the host vehicle. The method can also determine an occlusion caused by an elevation peak.

14 Claims, 10 Drawing Sheets

SYSTEM AND METHOD FOR GENERATING AN OCCLUSION MAP USING CROWDSOURCING

INTRODUCTION

The present disclosure relates to a system and method for generating an occlusion map using crowdsourcing.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include sensors configured to detect dynamic objects (e.g., vehicles and pedestrians) on the road. However, undetectable and/or unmapped static objects (e.g., vegetation, buildings, a truck at a loading dock etc.) and elevation road changes may occlude dynamic objects (e.g., vehicles and pedestrians) from the sensors of the vehicle. It is therefore desirable for autonomous and semi-autonomous vehicles to obtain information about these occlusions to be able to select routes that avoid encounters with dynamic objects that are occluded from the sensors that lead to unacceptably short reaction times and possible contact with the dynamic objects.

Due to buildings/large parked vehicles/trees etc., the effective field of view and range of the sensors when approaching an intersection can be lower than the sensor limits. Similarly, elevation changes can decrease the useful lookahead distance of a vehicle. Knowledge of the effective field of view can inform route selection and maneuver behaviors to avoid or mitigate occluded road risks, such as unprotected turns at intersections along an autonomous driving route. The present disclosure proposes system and method for generating an occlusion map considering the off-road static and 3-D objects in the scene as well as elevation changes in the road. The method uses the perception data on the cloud collected from multiple vehicles at the same region over time to build the occlusion map for that region. LiDAR data or high-definition maps with 3-D information are not needed but may be utilized. The data collection is agnostic to the vehicle sensor suite, i.e., vehicles with different sensor suite may contribute to the collected data. Different sensor modalities and sensor mounting heights can result in multiple occlusion maps that a vehicle can use as appropriate. Temporal changes in the driving scenario (such as growing trees and vegetation, trucks parked for loading/unloading, school buses and snow piles) can be considered in the occlusion maps using data collected over different times in the occluded region.

SUMMARY

The present disclosure describes a crowdsourcing system and method for creating an occlusion map that indicates areas occluded from the sensors. By using the presently disclosed method and system, the autonomous and semi-autonomous vehicles may know the areas occluded from its sensors and therefore make better routing decisions to avoid contact with objects on the road, such as other vehicles and/or pedestrians.

In an aspect of the present disclosure, a method for generating an occlusion map using crowdsourcing includes receiving occlusion data from at least one host vehicles. The host vehicle includes at least one sensor. The sensor is configured to detect a plurality of dynamic objects. The occlusion data includes a plurality of virtual detection lines each extending from the sensor of each of the host vehicle and the plurality of remote vehicles to the one of the plurality of dynamic objects detected by the at least one sensor. Each of the plurality of virtual detection lines intersects an off-road area. The method further includes marking all non-occluded points that are located inside the off-road area and that are located within a predetermined distance from each plurality of virtual detection lines. The method further includes determining a non-occluded region inside the off-road area using the non-occluded points that have been previously marked inside the off-road area, wherein the non-occluded region is part of non-occlusion data. The method further includes generating an occlusion map using the non-occlusion data. The method further includes transmitting the occlusion map to the host vehicle. The method described in this paragraph improves vehicle technology by allowing autonomous and semi-autonomous vehicles to know the areas occluded from its sensors and therefore make better routing decisions to avoid contact with objects on the road, such as other vehicles and/or pedestrians.

In aspect of the present disclosure, the method further includes controlling the host vehicle using the occlusion map. Marking all the non-occluded points that are located inside the off-road area and that are located within a predetermined distance from each plurality of virtual detection lines includes creating rectangles for each of the plurality of virtual detection lines by expanding a width of each of the plurality of virtual detection lines by a predetermined width value.

In an aspect of the present disclosure, the occlusion data includes temporal classification data. The temporal classification data includes information about occlusion observations by the at least one sensor of each of the host vehicle divided into segments of time.

In an aspect of the present disclosure, the occlusion data includes sensor classification data. The sensor classification data includes information about sensor modality and sensor mounting height and sensor mounting orientation (which determines sensor view direction) relative to the vehicle body.

In an aspect of the present disclosure, the method further includes receiving occlusion data by a remote server. The remote server is located remotely relative to the host vehicle and the plurality of remote vehicles.

In an aspect of the present disclosure, determining the non-occluded region inside the off-road area using the non-occluded points that have been previously marked inside the off-road area is conducted periodically at predetermined time intervals.

In an aspect of the present disclosure, the method further includes receiving, by the host vehicle, the occlusion map from a remote server. The method further includes drawing a plurality of virtual field-of-view lines that span a nominal field of view of the sensor in a navigational map. The method further includes determining whether one or more of the virtual field-of-view lines passes through an occluded off-road region. The occluded off-road region is outside the non-occluded region but inside the off-road area. The method further includes marking all occluded points that are located inside the off-road area and that are located within a predetermined distance from each plurality of virtual field-of-view lines to identify a fully occluded region. Controlling the host vehicle using the occlusion map includes controlling the host vehicle using the fully occluded region.

In an aspect of the present disclosure, a method for generating an occlusion map using crowdsourcing includes collecting sensor data. The sensor data originates from a sensor of a host vehicle and includes an effective range of road edge sensing of the sensor. The effective range of road edge sensing of the sensor is a distance from the host vehicle to a farthest road edge in relation to the host vehicle that the sensor is able to detect. The method further includes determining whether the effective range of road edge sensing of the sensor of the host vehicle is less than a predetermined threshold value. the method includes, in response to determining that the effective range of road edge sensing of the sensor of the host vehicle is less than the predetermined threshold value, recording the effective range of road edge sensing of the sensor of the host vehicle. The method further includes transmitting the effective range of road edge sensing of the sensor of the host vehicle to a remote server. The method described in this paragraph improves vehicle technology by allowing autonomous and semi-autonomous vehicles to know the areas occluded from its sensors and therefore make better routing decisions to avoid contact with objects on the road, such as other vehicles and/or pedestrians.

In an aspect of the present disclosure, the method further includes, in response to determining that the effective range of road edge sensing of the sensor of the host vehicle is less than a predetermined threshold value, collecting Global Navigation Satellite System (GNSS) data received from a GNSS transceiver of the host vehicle to confirm that a road in which the host vehicle is traveling has an elevation peak that affects the effective range of road edge sensing of the sensor in the host vehicle.

In an aspect of the present disclosure, the method further includes, in response to determining that the effective range of road edge sensing of the sensor of the host vehicle is less than the predetermined threshold value, collecting inertial measurement unit (IMU) data from an IMU of the host vehicle to confirm whether the road in which the host vehicle is traveling has the elevation peak that affects an effective sensing range of the sensor in the host vehicle.

In an aspect of the present disclosure, the method further includes, in response to confirming that the road in which the host vehicle is traveling has the elevation peak that affects the effective sensing range of the sensor in the host vehicle using the IMU data and the GNSS data, transmitting the GNSS data and the IMU data to the remote server.

In an aspect of the present disclosure, the sensor data includes information about sensor modality and sensor mounting height and mounting orientation relative to vehicle body.

In an aspect of the present disclosure, the method further includes transmitting the sensor data to the remote server.

In an aspect of the present disclosure, a system for generating an occlusion map using crowdsourcing includes a remote server including a server controller. The server controller is programmed to receive occlusion data from one or more host vehicle. Each of the host vehicle includes at least one sensor. The sensor is configured to detect a plurality of dynamic objects. The occlusion data includes a plurality of virtual detection lines each extending from the at least one sensor of the host vehicle to the one of the plurality of dynamic objects detected by the one sensor. Each of the plurality of virtual detection lines intersects an off-road area. The server controller is further programmed to mark all non-occluded points that are located inside the off-road area and that are located within a predetermined distance from each plurality of virtual detection lines. The server controller is programmed to determine a non-occluded region inside the off-road area using the non-occluded points that have been previously marked inside the off-road area. The non-occluded region is part of non-occlusion data. The server controller is programmed to generate an occlusion map using the non-occlusion data. The server controller is further programmed to transmit the occlusion map to the host vehicle. The system described in this paragraph improves vehicle technology by allowing autonomous and semi-autonomous vehicles to know the areas occluded from its sensors and therefore make better routing decisions to avoid contact with objects on the road, such as other vehicles and/or pedestrians.

In an aspect of the present disclosure, the vehicle controller is programmed to control the host vehicle using the occlusion map. The server controller is configured to create rectangles for each of the plurality of virtual detection lines by expanding a width of each of the plurality of virtual detection lines by a predetermined width value.

In an aspect of the present disclosure, the occlusion data includes temporal classification data. The temporal classification data includes information about occlusion observations by the at least one sensor of each of the host vehicle and the plurality of remote vehicles divided into segments of time.

In an aspect of the present disclosure, the occlusion data includes sensor classification data. The sensor classification data includes information about sensor modality and sensor mounting height and sensor mounting orientation relative to the vehicle body.

In an aspect of the present disclosure, the remote server is located remotely relative to the host vehicle and the plurality of remote vehicles.

In an aspect of the present disclosure, the server controller is configured to determine the non-occluded region inside the off-road area using the non-occluded points that have been previously marked inside the off-road area periodically at predetermined time intervals.

In an aspect of the present disclosure, the system further includes a host vehicle in communication with the remote server. The host vehicle includes a vehicle controller configured to receive the occlusion map from the remote server. The vehicle controller is configured to project a plurality of virtual field-of-view lines that span a nominal field of view of the at least one sensor in a navigational map. The vehicle controller is configured to determine whether one or more of the virtual field-of-view lines passes through an occluded off-road region. The occluded off-road region is outside the non-occluded region but inside the off-road area. The vehicle controller is configured to mark all occluded points that are located inside the off-road area and that are located within a predetermined distance from each plurality of virtual field-of-view lines to identify a fully occluded region. The vehicle controller is configured to control the host vehicle using the occlusion map includes controlling the host vehicle based the fully occluded region.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
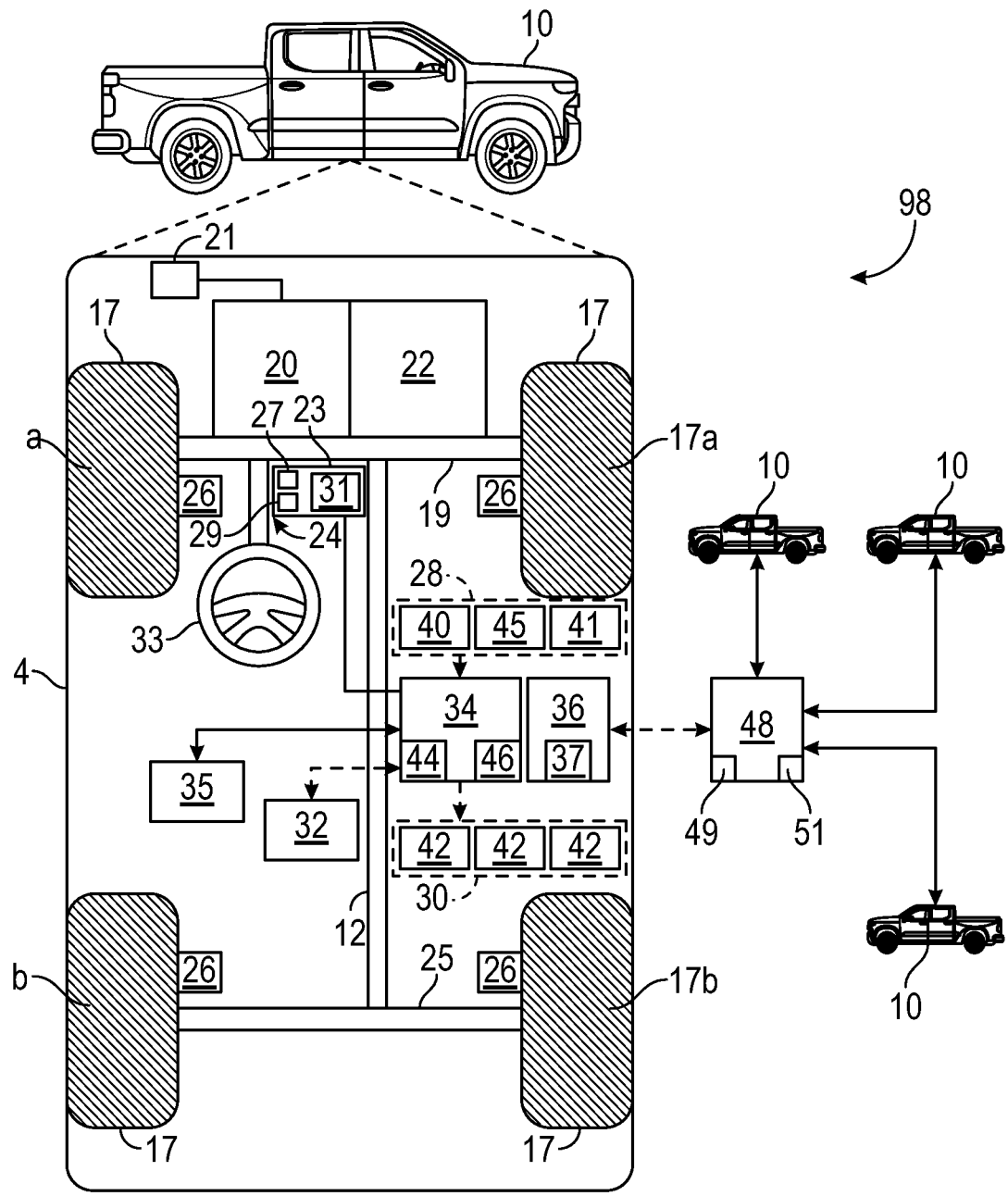
FIG. 1 is a block diagram depicting an embodiment of a vehicle including a system for generating an occlusion map using crowdsourcing.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 generally includes a chassis 12, a body 14, front and rear wheels 17 and may be referred to as a vehicle system. In the depicted embodiment, the host vehicle 10 includes two front wheels 17a and two rear wheels 17b. The body 14 is arranged on the chassis 12 and substantially encloses components of the host vehicle 10. The body 14 and the chassis 12 may jointly form a frame. The wheels 17 are each rotationally coupled to the chassis 12 near a respective corner of the body 14. The host vehicle 10 includes a front axle 19 coupled to the front wheels 17a and a rear axle 25 coupled to the rear wheels 17b.

In various embodiments, the host vehicle 10 is an autonomous vehicle or a semi-autonomous vehicle and may be considered part of a system 98 for generating an occlusion map using crowdsourcing. The system 98 may be referred to as the control system. In the present disclosure, the term "crowdsourcing" means seeking information from a plurality of vehicles. The host vehicle 10 is, for example, a vehicle that is automatically controlled to carry passengers from one location to another. The host vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the host vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the host vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control.

As shown, the host vehicle 10 generally includes a propulsion system 20, a transmission system 22, a steering system 24, a brake system 26, a sensor system 28, an actuator system 30, at least one data storage device 32, at least one vehicle controller 34, and a communication system 36. The propulsion system 20 may, in various embodiments, include an electric machine such as a traction motor and/or a fuel cell propulsion system. The host vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. It is envisioned, however, that the host vehicle 10 may not include transmission system 22 if the propulsion system 20 is configured as an electric motor. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the host vehicle 10. The sensors 40 are in communication with the vehicle controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more Global Navigation Satellite System (GNSS) transceivers 45 (e.g., Global Positioning System (GPS) transceivers), one or more tire pressure sensors, one or more cameras (e.g., optical cameras and/or infrared cameras), one or more gyroscopes, one or more accelerometers, one or more inclinometers, one or more speed sensors, one or more ultrasonic sensors, one or more inertial measurement units (IMUs) 41 and/or other sensors. Each sensor 40 is configured to generate a signal that is indicative of the sensed observable conditions of the exterior environment and/or the interior environment of the host vehicle 10. Because the sensor system 28 provides data to the vehicle controller 34, the sensor system 28 and its sensors 40 are considered sources of information (or simply sources).

As discussed above, the sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is configured to communicate with a GNSS to locate the position of the host vehicle 10 in the globe. The GNSS transceiver 45 is in electronic communication with the vehicle controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the host vehicle 10. In various embodiments, the data storage device 32 stores defined maps of the navigable environment. In various embodiments, the defined maps may be predefined by and obtained from a remote system. For example, the defined maps may be assembled by the remote system and communicated to the host vehicle 10 (wirelessly and/or in a wired manner) and stored in the data storage device 32. The data storage device 32 may be part of the vehicle controller 34, separate from the vehicle controller 34, or part of the vehicle controller 34 and part of a separate system.

The host vehicle 10 may further include one or more airbags 35 in communication with the vehicle controller 34 or another controller of the host vehicle 10. The airbag 35 includes an inflatable bladder and is configured to transition between a stowed configuration and a deployed configuration to cushion the effects of an external force applied to the host vehicle 10. The sensors 40 may include an airbag sensor, such as an IMU, configured to detect an external force and generate a signal indicative of the magnitude of such external force. The vehicle controller 34 is configured to command the airbag 35 to deploy based on the signal from one or more sensors 40, such as the airbag sensor. Accordingly, the vehicle controller 34 is configured to determine when the airbag 35 has been deployed.

The vehicle controller 34 includes at least one vehicle processor 44 and a vehicle non-transitory computer readable storage device or media 46. The vehicle processor 44 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the host vehicle 10. The vehicle controller 34 of the host vehicle 10 may be programmed to execute the methods 100 and 400 described in detail below.

The instructions may include one or more separate programs, each of which comprises an ordered listing of executable instructions for implementing logical functions. The instructions, when executed by the vehicle processor 44, receive and process signals from the sensor system 28, perform logic, calculations, methods and/or algorithms for automatically controlling the components of the host vehicle 10, and generate control signals to the actuator system 30 to automatically control the components of the host vehicle 10 based on the logic, calculations, methods, and/or algorithms. Although a single vehicle controller 34 is shown in FIG. 1, embodiments of the host vehicle 10 may include a plurality of vehicle controllers 34 that communicate over a suitable communication medium or a combination of communication mediums and that cooperate to process the sensor signals, perform logic, calculations, methods, and/or algorithms, and generate control signals to automatically control features of the host vehicle 10.

Figure 6:
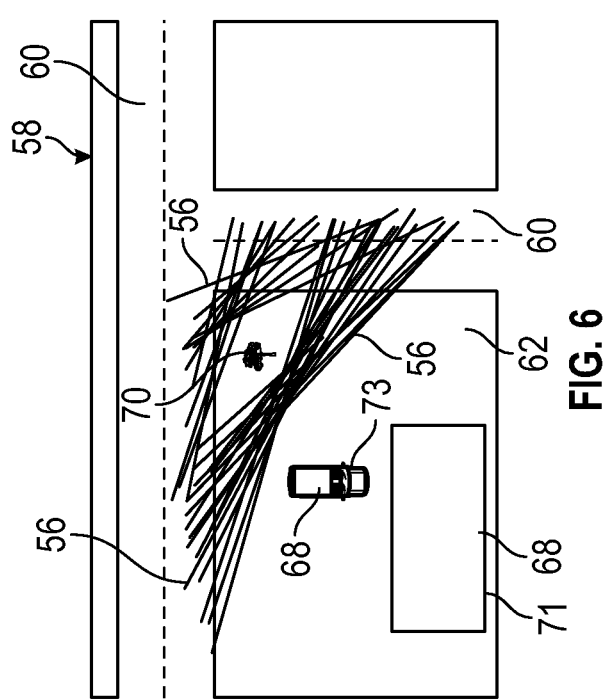
FIG. 6 is a schematic illustration of a navigational map depicting virtual detection lines received by the remote server during the data processing step of FIG. 5.

In various embodiments, one or more instructions of the vehicle controller 34 are embodied in the control system 98. The host vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the host vehicle 10. The user interface 23 is in electronic communication with the vehicle controller 34 and is configured to receive inputs by a user (e.g., a vehicle operator or a vehicle passenger). For example, the user interface 23 may include a touch screen and/or buttons configured to receive inputs from a vehicle user 11 (FIG. 6). Accordingly, the vehicle controller 34 is configured to receive inputs from the user via the user interface 23. The host vehicle 10 may include one or more displays 29 configured to display information to the user (e.g., vehicle operator or passenger) and may be an augmented reality (AR) display.

The communication system 36 is in communication with the vehicle controller 34 and is configured to wirelessly communicate information to and from one or more remote servers 48, such as but not limited to, remote systems at a remote call center (e.g., ON-STAR by GENERAL MOTORS). The remote server 48 may be a cloud-based system. In the present disclosure, the term "remote server" means a piece of computer hardware or software (computer program) that provides functionality for other programs or devices, called "clients". In this case, the clients are remote vehicles 47 and the host vehicle 210. In the present disclosure, the term "remote vehicle" means a vehicle that is not physically connected to the host vehicle or the remote server 48. As used herein the, the term, "remote server" means a server that is not physically connected to the host vehicle 10 and/or the remote vehicles 47. The remote server 48 may include a server controller 49 and a server non-transitory computer readable storage device or media 51. The server processor 49 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The server computer readable storage device or media 51 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The server computer-readable storage device or media 51 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the control system 98. The remote server 48 may also include communication transceivers 37 to wirelessly transmit data to the host vehicle 10 and/or the remote vehicles 47. The server controller 49 may be programmed to execute the method 200 described in detail below.

In certain embodiments, the communication system 36 of the host vehicle 10 is a wireless communication system configured to communicate via a wireless local area network (WLAN) using IEEE 802.11 standards or by using cellular data communication. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the host vehicle 10 and the remote server 48. Further, the remote vehicles 47 may include all or some of the components of the host vehicle 10 described above. The remote server 48 is in communication with one or more host vehicles 10.

Figure 2:
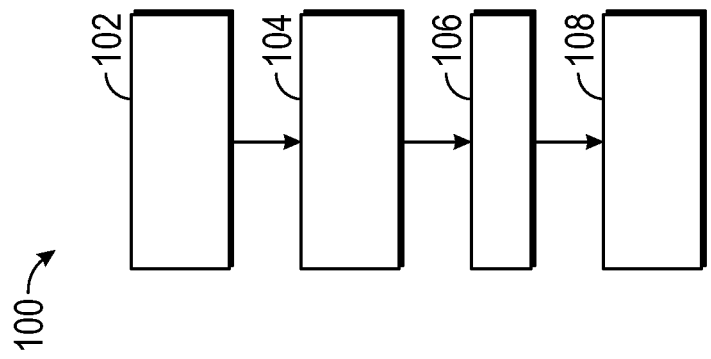
FIG. 2 is a flowchart of a method for generating an occlusion map using crowdsourcing, wherein this method includes a data collection step, a data processing step, a deployment step, and a controlling step.

With reference to FIG. 2, the present disclosure describes a method 100 for generating an occlusion map using crowdsourcing. The method 100 begins at block 102, which entails collecting occlusion data from one or more the host vehicles 10. As discussed above, each of the host vehicles 10 includes one or more sensors 40, such as cameras and/or lidar sensors. Regardless of their type, the sensors 40 are configured to detect one or more dynamic objects 43 (FIG. 4), such as other remote vehicles 47. To collect the occlusion data, the vehicle controller 34 of one or more host vehicles 10 receive the occlusion data from one or more sensors 40. Then, the vehicle controller 34 of one or more host vehicles 10 transmits the occlusion data, using for example the communication transceivers 37, to the remote server 48. The remote server 48 is located remotely relative to the host vehicle 10. Once the remote server 48 receives the occlusion data from one or more host vehicles 10 (i.e., crowdsourcing), the method 100 proceeds to block 104.

Figure 4:
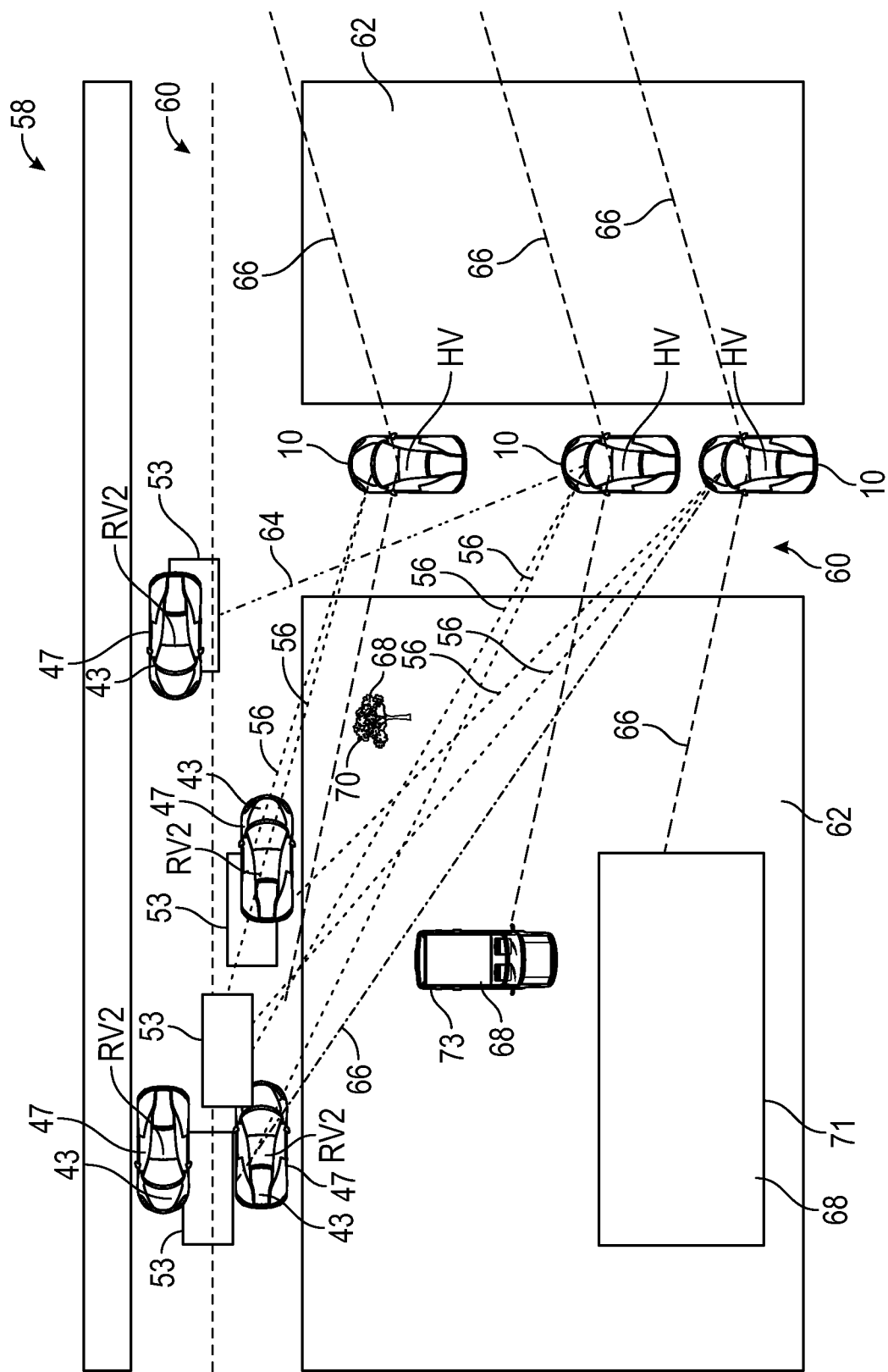
FIG. 4 is a schematic illustration of the data collection step of FIG. 1.
Figure 5:
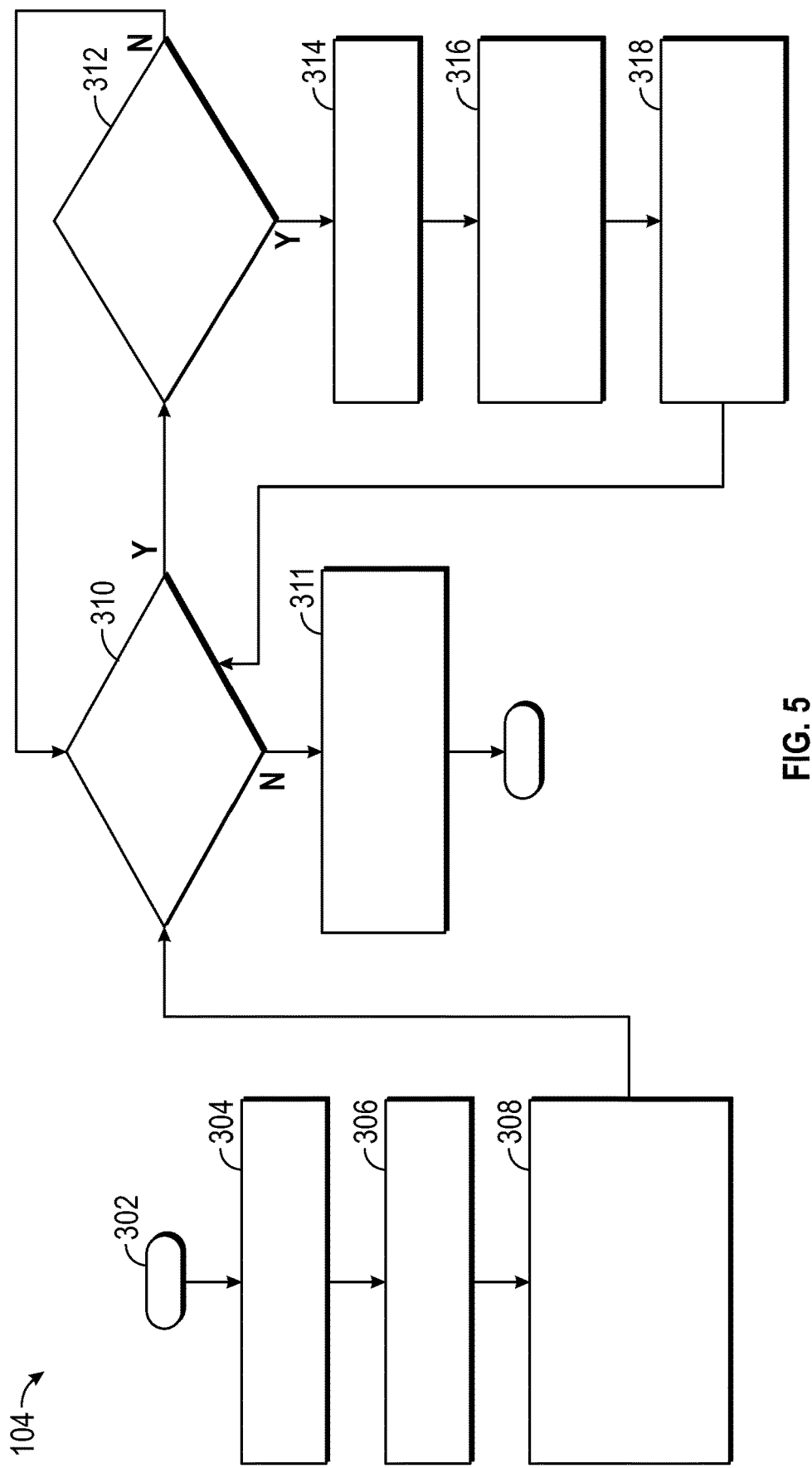
FIG. 5 is a flowchart of a method for performing the data processing step of the method of FIG. 1.

At block 104, the remote server 48 processes the occlusion data received from one or more host vehicles 10 to determine which off-road areas are not occluded. In other words, the remote server 48 determines the non-occluded regions inside off-road areas 62 (FIG. 4) to develop non-occluded region data. The non-occluded region data includes information about the non-occluded regions inside the off-road areas 62 (FIG. 4). Next, the method 100 proceeds to block 106.

At block 106, the remote server 48 transmits (or deploys) the non-occluded region data to the host vehicle 10. Then, the vehicle controller 34 determines an occluded region for each sensor 40 of the host vehicle 10 using the non-occluded region data. As a result, the vehicle controller 34 generates an occluded map using the non-occluded data received from the remote server 48. Subsequently, the method 100 continues to block 108.

At block 108, the vehicle controller 34 controls the host vehicle 10 using the occluded map to avoid coming into contact with other objects, such as remote vehicles 47. The occlusion map helps the vehicle controller 34 identify areas that the sensors 40 cannot detect, thereby providing enhanced information to control the movements of the host vehicle 10.

Figure 3:
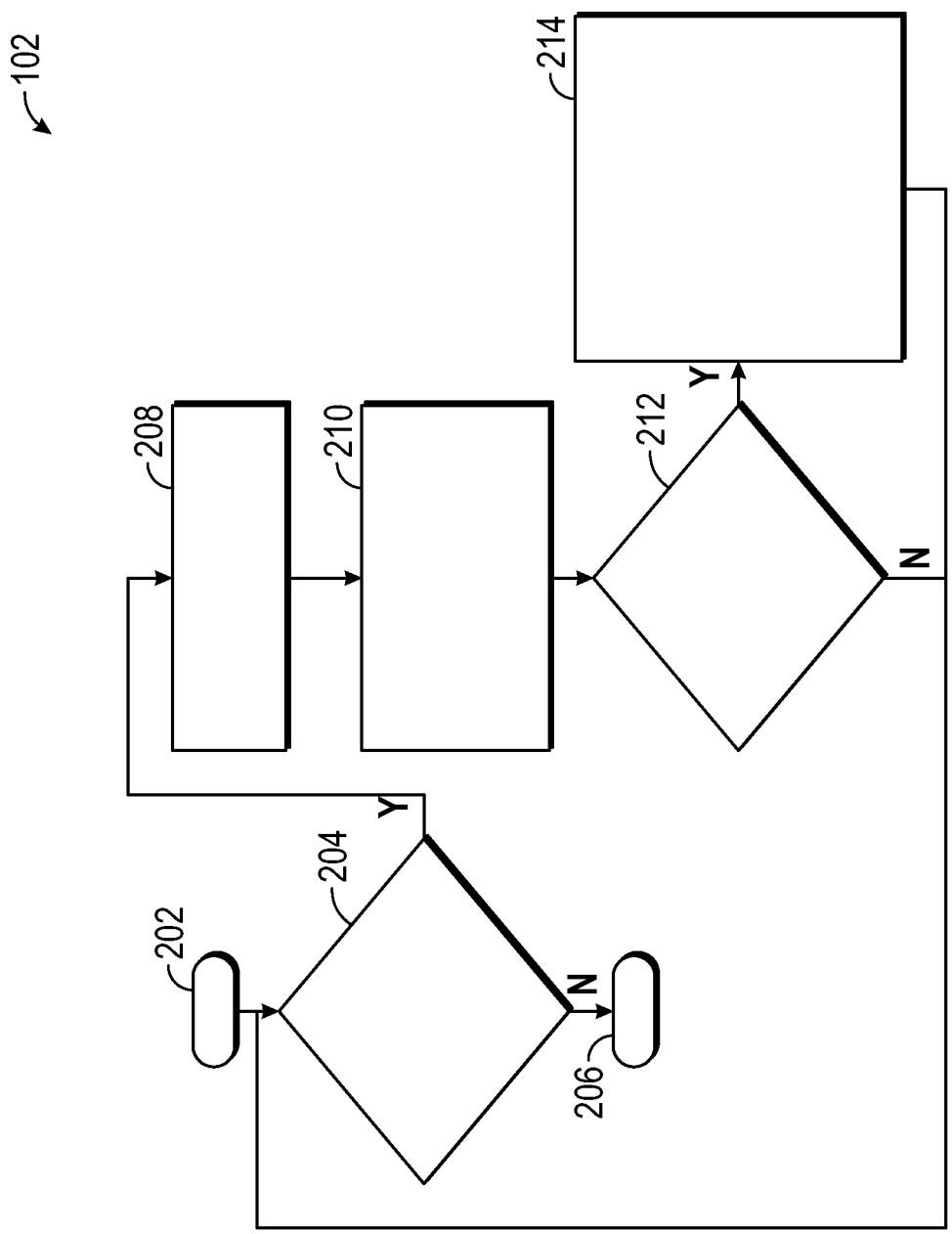
FIG. 3 is a flowchart of a method for performing the data collection step of the method of FIG. 1.

With reference to FIGS. 3 and 4, a method 102 for collecting occlusion data from the host vehicle 10 begins at block 202. At block 202, the sensors 40 of one or more host vehicles 10 detect objects, such as pedestrians and/or other remote vehicles 47. As discussed above, the sensors 40 are configured to detect objects, such as remote vehicles 47 and/or pedestrians. Then, the vehicle controller 34 determines (or estimates) the location (i.e., estimated location 53) of dynamic objects 43 (e.g., remote vehicles 47 and/or pedestrians) in the 3D world using, for example, data obtained from the GNSS transceiver 45 and/or data received from communication transceivers 37 using V2V and/or V2I communications. In the present disclosure, the term "dynamic objects" means objects that are moving. If the sensor system 28 tracks dynamic objects 43 through occlusions, the vehicle controller 34 checks whether the current reported location is directly observed by one or more sensors 40 or if it is a tracking projection based on prior observations. If the sensor system 28 determines a tracking projection based on prior observations, the vehicle controller 34 either ignores this observation or flags it as a projected location of the dynamic object. The method 100 then proceeds to block 206.

At block 204, the vehicle controller 34 of the host vehicle determines whether there any dynamic objects 43 detected by the sensors 40 that have not been processed. In other words, the vehicle controller 34 determines whether all the steps 210, 212, and 214 have been executed for each of the dynamic objects 43 detected by the sensors 40. If all the detected dynamic objects 43 have been processed, the method 102 proceeds to block 206. At block 206, the method 100 ends. If one or more of the detected dynamic objects 43 have not been processed, then the method 102 proceeds to block 208.

At block 208, the vehicle controller 34 selects one of the detected dynamic objects 43 that has not been processed. Next, the method 100 proceeds to block 210. At block 210, for each sensor 40 of the host vehicle 10 that detects dynamic objects 43, the vehicle controller 34 determines (i.e., finds) a line (i.e., the virtual detection line 56) extending from the sensor 40 to the estimated location 53 of the detected dynamic object 43. Then, the method 102 proceeds to block 212.

At block 212, the vehicle controller 34 determines whether the virtual detection line 56 intersects one or more contiguous off-road areas 62 in a navigational map 58. In the present disclosure, the term "off-road area" means an area that does not cover a road 60. In the present disclosure, the term "road" means a way leading from one place to another that has a specially prepared surface intended for vehicles and does not include sidewalks or other ways intended for pedestrians except for areas designated for pedestrians to cross the driving surface (e.g., a marked crosswalk). As used herein, the term "navigational map" means a map of the current route of the host vehicle 10 The navigational map 58 may be stored on the vehicle computer readable storage media 46. The navigational map 58 may include roads 60 along the route of the host vehicle 10 and occlusions 68, such as a tree 70, a building 71, and/or a parked truck 73 (i.e., a stationary truck). A virtual detection line 56 that does not intersect an off-road area 62 is named a road detection line 64. Road detection lines 64 are not uploaded to the server 48. If the virtual detection line 56 does not intersect one or more off-road areas 62 in the navigational map 58, then the method 102 returns to block 204. If the detection line 56 intersects one or more off-road areas 62, then the method 102 proceeds to block 214.

At block 214, the vehicle controller 34 uploads the virtual detection lines 56 and the corresponding estimated location 53 of the dynamic object 43 (including an observation versus projection state if relevant) to the remote server 48. In addition, the vehicle controller 34 uploads a timestamp, sensor modality, and sensor mounting height and sensor mounting orientation (which determines sensor view direction) relative to the vehicle body corresponding to the virtual detection line 56 to the remote server 48. In present disclosure, the term "timestamp" means a digital record of the time when the sensor 40 detected the dynamic object 43. As used herein, the term "sensor modality" means the type of sensor 40 used to detect the dynamic object 43. The sensor modality may be a camera, lidar, etc. The term "sensor mounting height" means to high from a ground to a position of the sensor 40. Each sensor 40 has a sensor mounting orientation relative to the vehicle body 14. The sensor mounting orientation determines the sensor view direction. For illustration purposes, FIG. 4 also shows some non-detection lines 66 extending from the sensors 40 in situations when the sensors 40 do not detect a dynamic object 43. The virtual detection lines 56, the estimated location 53 of the dynamic objects 43, the sensor modality for each sensor 40 used to detect the dynamic objects 43, the timestamp for each virtual detection line 56, the sensor mounting orientation, and sensor mounting height for each sensor 40 used to detect the dynamic objects 43 uploaded to the remote server 48 are collectively referred to as occlusion data. Therefore, the occlusion data includes, but is not limited to, the virtual detection lines 56 corresponding to each detected dynamic object 43, the estimated location 53 of each of the detected dynamic objects 43, the sensor modality for each sensor 40 used to detect the dynamic objects 43, the timestamp for each virtual detection line 56, the sensor mounting orientation, and sensor mounting height for each sensor 40 used to detect the dynamic objects 43.

With reference to FIGS. 5-8, FIG. 5 is a flowchart of a method 104 for processing data collected by the sensors 40 of one or more host vehicles 10. The method 104 begins at block 302 and is performed periodically at a predetermined time intervals (e.g., every twenty-four hours). At block 302, the server controller 49 of the remote server 48 receives the occlusion data, including the virtual detection line 56 and timestamps, from the host vehicle 10. The method 100 then proceeds to block 304.

At block 304, the server controller 49 deletes the virtual detection lines 56 that are older than a predetermined number of days old. To do this, the server controller 49 may use the timestamps of each virtual detection line 56 to determine which virtual detection line is older than the predetermined number of days. Then, the method 104 proceeds to block 306.

At block 306, the server controller 49 adds the recently uploaded virtual detection lines 56 to a list of lines as shown in FIG. 6. Then, the method 104 continues to block 308. At block 308, the server controller 49 classifies the occlusion data (e.g., the virtual detection lines 56 uploaded to the remote server 48) into multiple classes based on temporal and sensor modality differentiations. Once the remote server 48 receives a predetermined amount of occlusion data, the server controller 49 uses the timestamp in the occlusion data to classify each occlusion observation into segments of time (e.g., different seasons, times of day, weekday vs. weekend, etc.). Also, once the remote server 48 receives a predetermined amount of occlusion data, the server controller 49 uses the sensor modality, sensor mounting orientation, and the sensor mounting height for each sensor 40 in the occlusion data to classify the occlusion observation into segments of sensor modality (e.g., camera, LiDAR, Radar and their combinations) and sensor mounting height (e.g., high, medium, low) segments. In other words, the occlusion data includes temporal classification data and, which includes information about occlusion observations by one or more sensors 40 of the host vehicle 10 divided into segments of time. Also, the occlusion data includes sensor classification data, which includes information about the sensor modality, sensor mounting orientation, and the sensor mounting height of each of the sensors 40 that detects one or more dynamic objects 43. Then, the method 104 proceeds to block 310.

At block 310, the server controller 49 determines whether any of the occlusion data uploaded to the remote server 48 that is not older than the predetermined number of days has not been processed. In other words, the server controller 49 determines whether the steps 314, 316, and 318 has been performed for all the occlusion data uploaded to the remote server 48 that is not older than the predetermined number of days. If the server controller 49 determines that all the occlusion data uploaded to the remote server 48 that is not older than the predetermined number of days has been processed, then the method 104 proceeds to block 311. At block 311, the remote server 48 transmits an occlusion map 72 indicates one or more non-occluded regions 78 (FIG. 8) inside one of the contiguous off-road areas 62 to all relevant vehicles, which may include the host vehicle 10 that are nearby (i.e., a predetermined distance from) the occlusions 68. Because the occlusion map 72 indicates the non-occluded regions inside the off-road areas 62, by inference, the occlusion map 72 indicates the regions inside that off-road area 62 that are occluded to the sensors 40. If the server controller 49 determines that some of the occlusion data uploaded to the remote server 48 that is not older than the predetermined number of days has not been processed, then the method 104 proceeds to block 312. Alternatively, the server controller 49 determines the amount of uploaded unprocessed data as a criterion.

At block 312, the server controller 49 of the remote server 48 determines whether any of the contiguous off-road areas 62 have not been processed. To do so, the server controller 49 determines whether the steps 314, 316, and 318 have been performed for all the contiguous off-road areas 62. Steps 314, 316, and 318 are conducted for each contiguous off-road area 62 until all the contiguous off-road area 62 are processed. Then, the method 104 proceeds to block 316.

Figure 7:
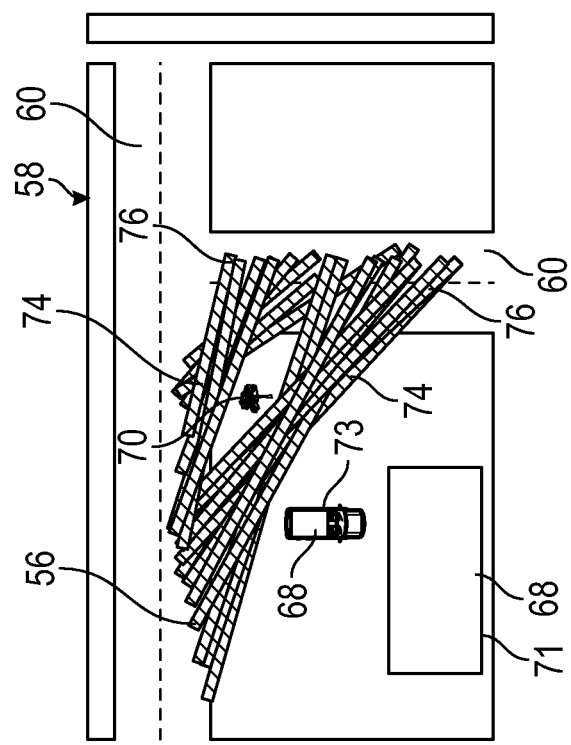
FIG. 7 is a schematic illustration of a process of expanding the virtual detection lines received by the remote server during the data processing step of FIG. 5.
Figure 8:
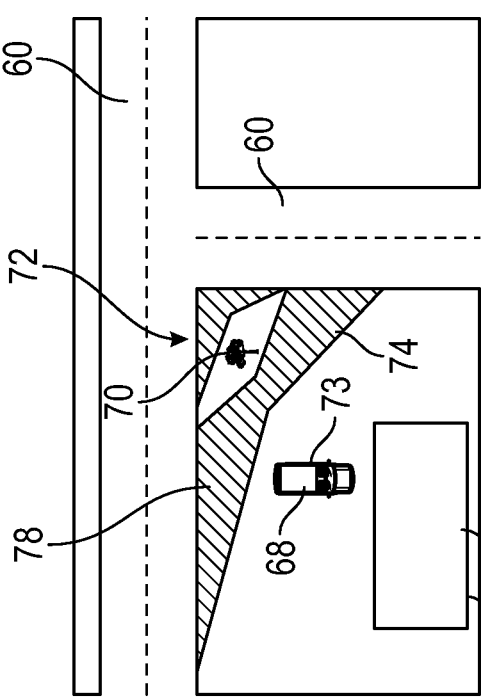
FIG. 8 is a schematic illustration of a process of determining a non-occluded region inside an off-road area.

At block 316, the server controller 49 marks all points inside the selected contiguous off-road area 62 that are at a distance that is equal to or less than a predetermined distance from each of the virtual detection lines 56 as "clear". The points that are marked as clear are called the non-occlusion points 74. To mark the occlusion points 74, the server controller 49 may create rectangles 76 for each of the plurality of virtual detection lines 56 by expanding a width of each of the virtual detection lines 56 by a predetermined width value as shown in FIG. 7. The predetermined width value may be determined by testing the system 98. Then, the server controller 49 determines (e.g., calculates) the non-occluded region 78 inside the off-road area 62 using the non-occluded points 74 (i.e., the points inside the selected contiguous off-road area 62 that are at a distance that is equal to or less than a predetermined distance from each of the virtual detection lines 56) and/or the rectangles 76 as shown in FIG. 8. Step 316 is conducted periodically at predetermined time intervals (e.g., every twenty-four hours) to provide the operator of the host vehicle 10 with the most updated information possible. Then, the method 104 proceeds to block 318.

At block 318, the non-occluded region 78 inside the off-road area 62 are stored on the remote server 48 for the current data class (i.e., the temporal class and the sensor class). For instance, the non-occluded region 78 inside the off-road area 62 may be stored on the server computer readable storage media 51. The non-occluded region 78 inside the off-road area 62 along with the corresponding temporal classification data and the sensor classification data are collectively referred to as the non-occluded data. Thus, the term "non-occluded data" means data indicating the non-occluded region 78 inside the off-road area 62 based on the input from the sensors 40 along with information about the temporal classification data and sensor classification data. As discussed above, the sensor classification data includes information about the sensor modality (e.g., camera, LiDAR, Radar and their combinations), sensor mounting orientation, and the sensor mounting height (e.g., high, medium, low) of the sensors 40 used to capture the dynamic objects 43. At least part of the non-occluded data may be in the form of an occlusion map 72 identifying one or more non-occluded regions 78 (FIG. 8) inside one of the contiguous off-road areas 62. The method 104 then returns to block 310.

As discussed above, at block 311, the server controller 49 transmits the non-occlusion data periodically to all relevant vehicles. The relevant vehicles may include the host vehicle 10 that are located at a distance from the occlusions 68 that equal to or less than a predetermined distance value. The server controller 49 may transmit the non-occlusion data periodically to all relevant vehicles once the non-occlusion data is mature and validated. In other words, the server controller 49 may transmit that non-occlusion data to the relevant vehicle once a predetermined amount of time has lapsed since the occlusion observations was collected and once a predetermined amount of non-occlusion data is generated. After block 311, the method 104 proceeds to block 320. At block 320, the method 104 ends.

Figure 9:
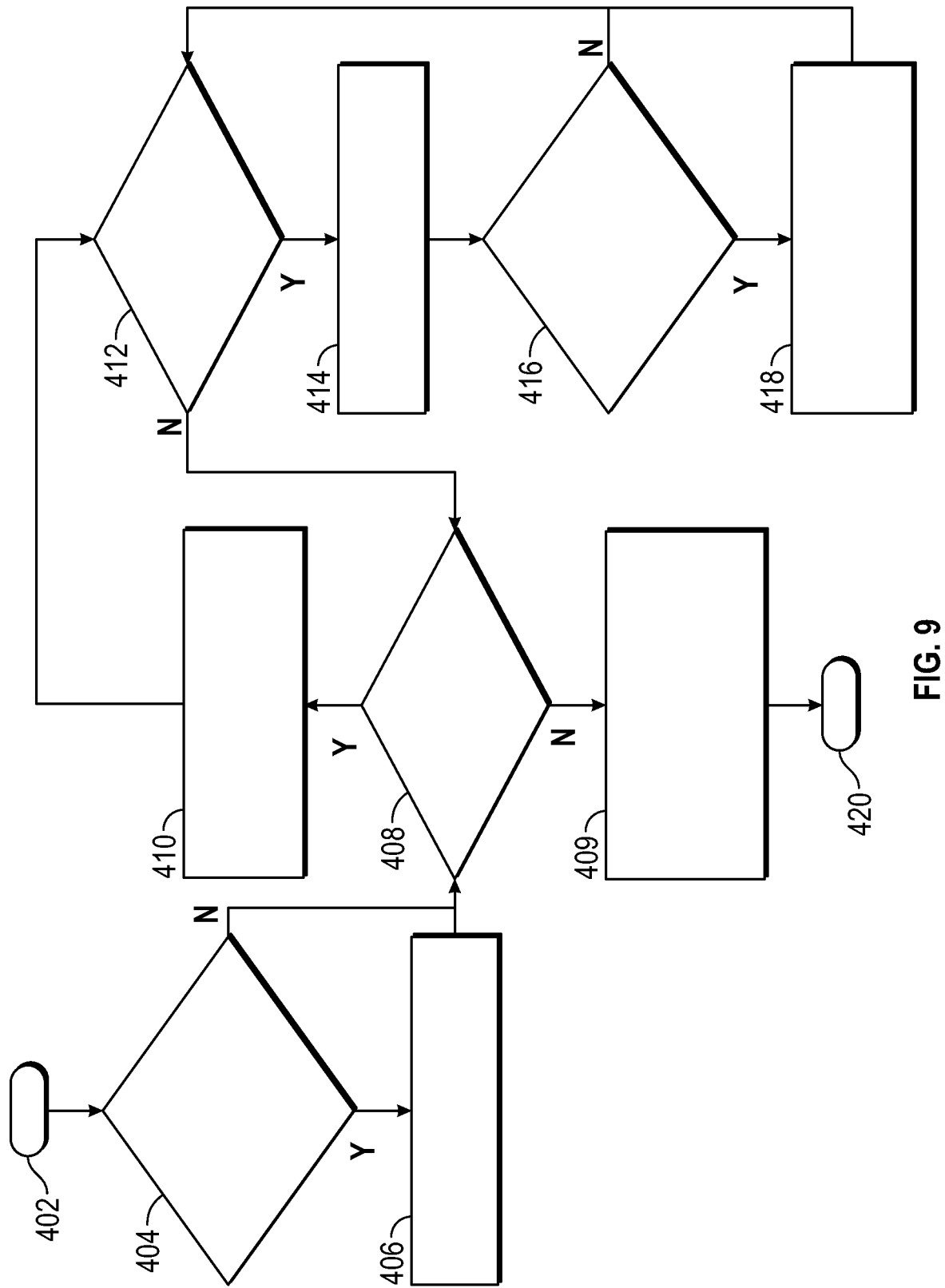
FIG. 9 is a flowchart of a method for deploying an occlusion map generated in the method of FIG. 5.
Figure 10:
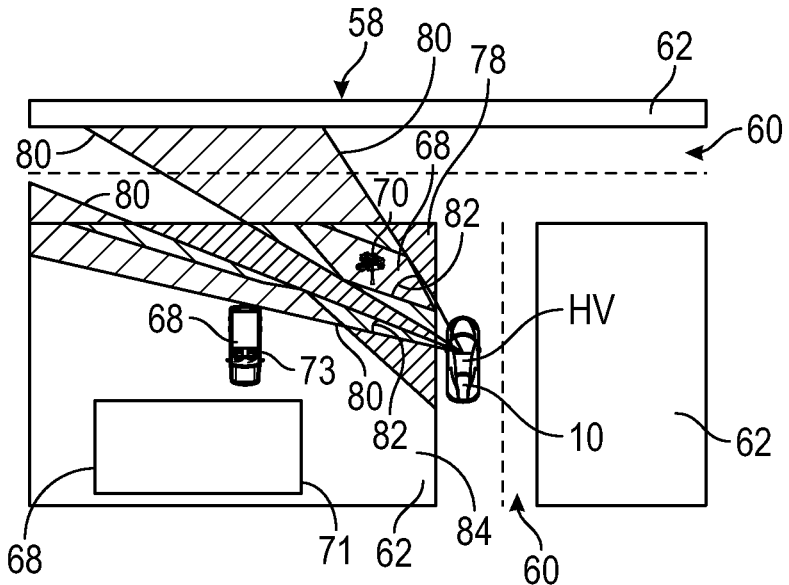
FIG. 10 is a schematic illustration of a navigational map depicting virtual field-of-view lines.
Figure 11:
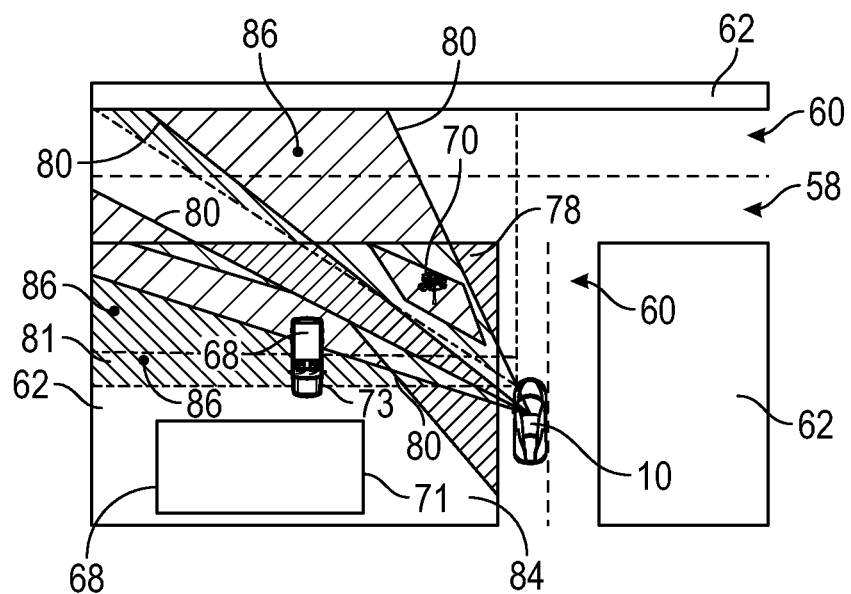
FIG. 11 is a schematic illustration of a navigational map depicting occluded points.

With reference to FIGS. 9-11, FIG. 9 is a flowchart of a method 106 for deploying the non-occluded region data to the host vehicle 10 that are located at a predetermined distance from the occlusions 68. The method 106 begins at block 402. At block 402, the host vehicle 10 located within a predetermined distance from the occlusions 68 receive the non-occlusion data, which includes the occlusion map 72. The vehicle controller 34 may receive latest occlusion data from the remote server 48 for the current route of the host vehicle 10 or for a region around the host vehicle 10. The data communication between remote server 48 and the host vehicle 10 may be based on a request per route or a periodic download of full set of occlusion maps 72 (for multiple temporal classes) with sensor configurations appropriate to the target vehicle (e.g., the host vehicle). Then, the method 106 continues to block 404.

At block 404, the vehicle controller 34 of the host vehicle 10 47 determine whether there are multiple temporal versions of the occlusion map 72. In other words, the vehicle controller 34 determines whether there are multiple versions of the occlusion map 72 generated using on occlusion observations collected by sensors 40 at different times. If there are not multiple temporal versions of the occlusion map 72, then the method 106 proceeds to block 408. If there are multiple temporal versions of the occlusion map 72, then the method 106 proceeds to block 406. At block 406, the vehicle controller 34 selects the temporal version of the occlusion map 72 that corresponds with the current time of use. Then, the method 106 proceeds to block 408.

At block 408, the vehicle controller 34 determines whether there are any unprocessed sensors 40. In other words, the vehicle controller 34 determines the steps 410, 412, 414, 416, and 418 have been performed for all sensors 40 of the host vehicle 10 that are configured to detect dynamic objects 43. If there are no unprocessed sensors 40, then the method 106 proceeds to block 409, which is described below. If there one or more sensors 40 have not been processed, then the method 106 proceeds to block 410.

At block 410, the vehicle controller 34 draws (i.e., creates via geometrical projection) a plurality of virtual field-of-view lines 80 in the navigational map 58 that span a nominal field of view 82 of one or more sensors 40 in a navigational map 58. Each of the virtual field-of-view lines 80 extends from one of the sensors 40 and is located within the nominal field of view 82 of the sensor 40. After block 410, the method 106 continues to block 412. At block 412, the vehicle controller 34 determines whether any of the virtual field-of-view lines 80 have not been processed. In other words, the vehicle controller 34 determines whether steps 414, 416, and 416 has been conducted for each of the virtual field-of-view lines 80. If all the virtual field-of-view lines 80 have been processed, then the method 106 returns to block 408. If one or more of the virtual field-of-view lines 80 have not been processed, then the method 106 proceeds to block 414. At 414, the vehicle controller 34 selects one of the virtual field-of-view lines 80 that have not been processed. Then, the method 106 proceeds to block 416. At block 416, the vehicle controller 34 determines whether any of the virtual field-of-view lines 80 for each sensor 40 intersects an occluded off-road region 84. The occluded off-road region 84 is a region inside the contiguous off-road area 62 but outside the non-occluded regions 78. Then, the method 106 continues to block 416.

At block 416, the vehicle controller 34 marks all points that are at a predetermined distance or less from the virtual field-of-view lines 80 that intersects the occlude off-road region 78 as "occluded" for the sensor 40. These points that are referred to as occluded points 86 as shown in FIG. 11. The process of block 409 is the same as the process in block 416. Block 409, however, further entails generating a fully occluded region 81, which corresponds to the intersection of the occluded off-road region 84 of all sensors 40. The vehicle controller 34 may using fully occluded region 81 to control the movements of the host vehicle 10. After block 409, the method 106 continues to block 420. At block 420, the method 106 ends.

Figure 12:
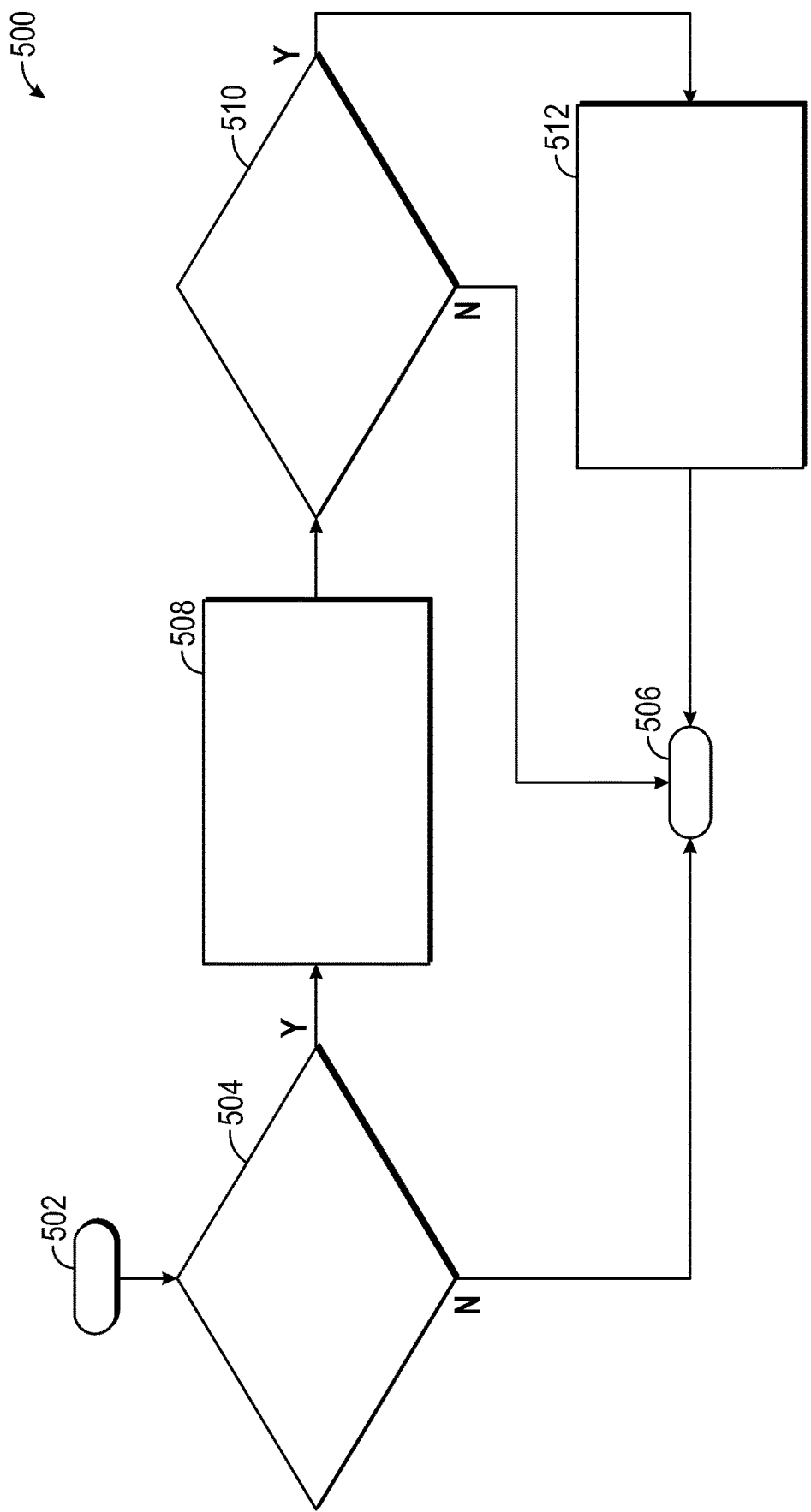
FIG. 12 is a flowchart of a method of generating an occlusion map using crowdsourcing when the road elevation affects sensing.
Figure 13:
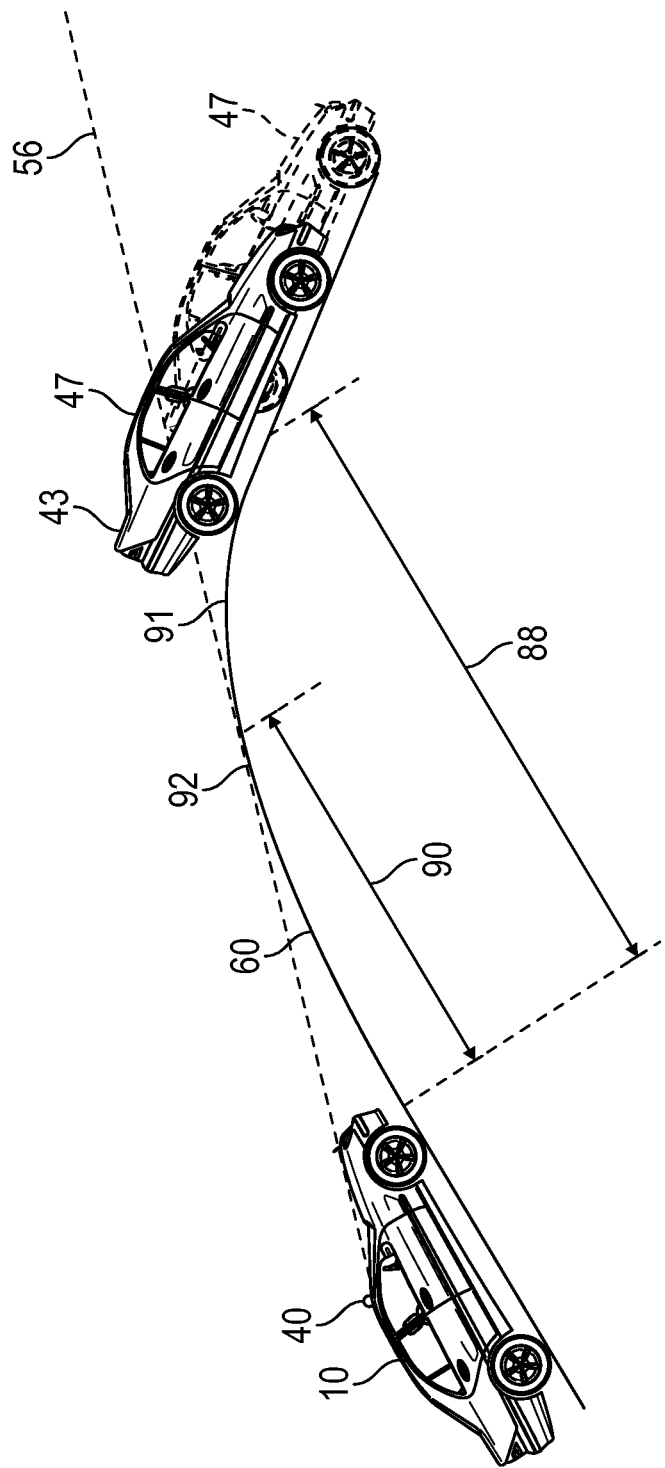
FIG. 13 is a schematic illustration of a situation when a road elevation affects sensing.

With reference to FIGS. 12 and 13, FIG. 12 is a flowchart of a method 500 of generating an occlusion map when the road elevation affects sensing, which corresponds to the data collection step 102 of method 100. The method 400 begins at block 502. At block 502, the vehicle controller 34 of the host vehicle 10 collects sensor data originating from one or more sensors 40 (e.g., camera, LiDAR, Radar, etc.) configured to detect dynamic objects 43, such as a remote vehicle 47. The sensor data includes an effective sensing range 88 of each sensor 40 configured to detect dynamic objects 43. In the present disclosure, the term "effective sensing range" is a distance from the sensor 40 of the host vehicle 10 to the farthest dynamic object 43 that the sensor 40 is able to detect. The sensor data also includes effective range of lane/road edge sensing 90. As used herein, the term "effective range of road edge sensing" means a distance from the sensor 40 of the host vehicle 10 to the farthest road edge 90 (relative to the host vehicle 10) that the sensor 40 is able to detect. In the present disclosure, the term "effective range of lane sensing" means a distance from the sensor 40 of the host vehicle 10 to the farthest lane marking (relative to the host vehicle 10) that the sensor 40 is able to detect. The sensor data also includes information about the appearance or disappearance of dynamic objects 43, such as the remote vehicle 47 in front of the host vehicle 10, from sensor readings of the sensor 40. Then, the method 400 continues to block 504.

At block 504, the vehicle controller 34 of the host vehicle 10 determines whether the effective range of road edge sensing or the effective range of lane sensing is less than a respective predetermined threshold value. Further, at block 504, the vehicle controller 34 of the host vehicle 10 determines whether the remote vehicle 47 in front of the host vehicle 10 disappears from the sensor readings (if the remote vehicle 47 is moving away from the host vehicle 10) at is distance from the host vehicle 10 that is less than expected or appears (if the remote vehicle 47 is moving toward the host vehicle 10) at a distance that is less than expected. If the effective range of road edge sensing or the effective range of lane sensing is equal to or greater than the respective predetermined threshold value or if the remote vehicle 47 in front of the host vehicle 10 disappears from the sensor readings or appears at a distance from the host vehicle 10 that is equal to or greater than expected, then the method 400 proceeds to block 506. At block 506, the method 400 ends. If the effective range of road edge sensing or the effective range of lane sensing is less than the respective predetermined threshold value or if the remote vehicle 47 in front of the host vehicle 10 disappears from the sensor readings or appears at a distance from the host vehicle 10 that is less than expected, then the method 400 proceeds to block 408.

At block 408, the vehicle controller 34 starts recording the effective range of road edge sensing, the effective range of lane sensing, the distance at which the remote vehicle 47 in front of the host vehicle disappears from the sensor readings and/or the distance at which the remote vehicle 47 in front of the host vehicle appears in the sensor readings. Further, at block 408, the vehicle controller 34 starts recording the IMU data from the IMUs 41 and/or the GNSS data received from the GNSS transceivers 45 (e.g., GPS transceivers). Then, the method 400 continues to block 510.

At block 510, the vehicle controller 10 of the host vehicle 10 uses the GNSS data and/or the IMU data to determine whether a road elevation of the road 62 has an elevation peak 91 that negatively affects the effective sensing range 88 of the sensor 40. If the vehicle controller 10 does not detect a peak 91 that explains the reduction in effective sensing range 88 of the sensor 40, then the method 500 continues to block 506. If the vehicle controller 10 detects an elevation peak 91 that explains the reduction in effective sensing range 88 of the sensor 40, then the method 500 proceeds to block 512.

At block 512, the vehicle controller 34 uses the communication transceivers 37 to upload the sensor data (e.g., GNSS data, the IMU data (including pitch), sensor modality, and/or sensor mounting height) to the remote server 48 for further classification. The method 500 may also include data processing process 600 and a deployment process 700.

Figure 14:
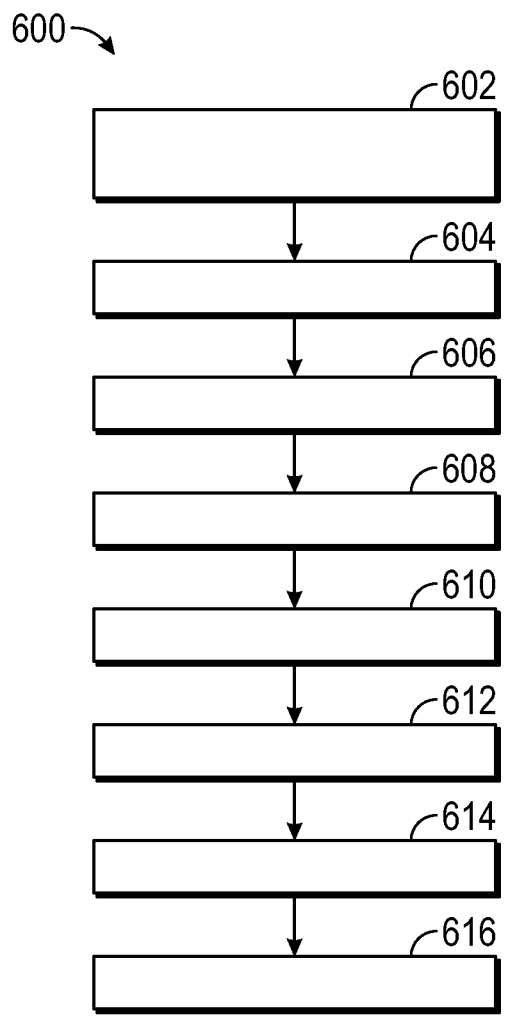
FIG. 14 is a flowchart of a data processing process for a situation when a road elevation affects sensing.

With reference to FIG. 14, the data processing process 600 occurs in the remote server 48 and begins at block 602. At block 602, the remote server 48 receives the sensor data collected from various vehicles (e.g., the host vehicle 10 and/or the remote vehicles 47) binned by different vehicle height classes. Then, at block 604, the remote server 48 fuses observations of multiple vehicles/passes in a particular direction. Next, at block 606, the remote server 48 determine the zone having predetermined fractional loss of effective range of road edge sensing and/or for effective range of lane sensing. Subsequently, at block 608, the remote server 48 adjusts lane and road edge variance estimates beyond the zone to increase the uncertainty. Then, at block 610, the remote server 48 determines which zones have a predetermined fractional loss of effective sensing range 88 for vehicles & vulnerable road users (VRUs). Next, at block 612, the remote server 48 adds or updates the zone(s) in an overall occlusion map—including maximum reduction in range(s). Optionally, at block 614, the remote server 48 uses the occlusion map to lower routing preferences for segments with occlusion zones and/or to disqualify segments for autonomous driving routes. Then, at block 616, through regression or other methods, the remote server 48 determines a model of elevation change to range-reduction, considering sensor modality, sensor mounting orientation, and sensor mounting height(s).

Figure 15:
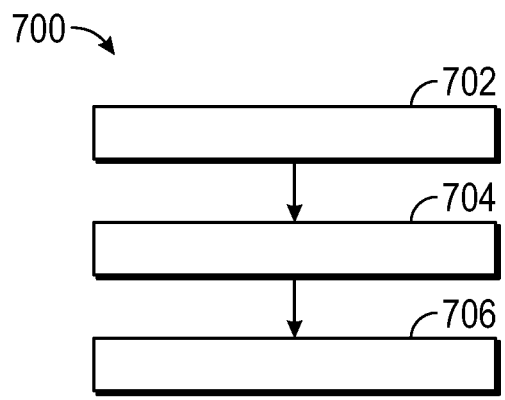
FIG. 15 is a flowchart of a deployment process for a situation when a road elevation affects sensing.

FIG. 15 is a flowchart of the deployment process 700, which begins at block 702. At block 702, the remote server 48 deploys an occlusion map and the occlusion model to a target vehicle, such as the host vehicle 10. Next, at block 704, after receiving the occlusion map and the occlusion model, the vehicle controller 34 commands the user interface 23 to provide warnings of encountered occlusions zones to the vehicle operator. Then, at block 706, the vehicle controller 34 may optionally adjust motion control parameters to enhance responsiveness over comfort in occluded zones. Then, at block 706, when operating in an autonomous driving mode, the vehicle controller 34 may optionally command the host vehicle 10 to reduce its speed in the occlusion zone based on the maximum reduction in object sensing range. Therefore, at block 706, the vehicle controller 34 controls the target vehicle (e.g., host vehicle 10) based on the information on the occlusion map.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for generating an occlusion map using crowdsourcing, comprising:
   receiving occlusion data from a host vehicle, wherein the host vehicle includes at least one sensor, the at least one sensor is configured to detect a plurality of dynamic objects, the occlusion data includes a plurality of virtual detection lines each extending from the at least one sensor of the host vehicle to the one of the plurality of dynamic objects detected by the at least one sensor, and each of the plurality of virtual detection lines intersects an off-road area;
   marking all non-occluded points that are located inside the off-road area and that are located within a predetermined distance from each plurality of virtual detection lines; and
   determining a non-occluded region inside the off-road area using the non-occluded points that have been previously marked inside the off-road area, wherein the non-occluded region is part of non-occlusion data;
   generating an occlusion map using the non-occlusion data; and
   transmitting the occlusion map to the host vehicle.

2. The method of claim 1, further comprising:
   controlling the host vehicle using the occlusion map; and
   wherein marking all the non-occluded points that are located inside the off-road area and that are located within a predetermined distance from each plurality of virtual detection lines includes creating rectangles for each of the plurality of virtual detection lines by expanding a width of each of the plurality of virtual detection lines by a predetermined width value.

3. The method of claim 1, wherein the occlusion data includes temporal classification data, wherein the temporal classification data includes information about occlusion observations by the at least one sensor of each of the host vehicle divided into segments of time.

4. The method of claim 1, wherein the occlusion data includes sensor classification data, wherein the sensor classification data includes information about sensor modality, sensor mounting orientation, and sensor mounting height.

5. The method of claim 1, wherein receiving occlusion data includes receiving, by a remote server, the occlusion data, wherein the remote server is located remotely relative to the host vehicle.

6. The method of claim 1, wherein determining the non-occluded region inside the off-road area using the non-occluded points that have been previously marked inside the off-road area is conducted periodically at predetermined time intervals.

7. The method of claim 2, further comprising:
   receiving, by the host vehicle, the occlusion map from a remote server;
   projecting a plurality of virtual field-of-view lines that span a nominal field of view of the at least one sensor in a navigational map;
   determining whether one or more of the virtual field-of-view lines passes through an occluded off-road region, wherein the occluded off-road region is outside the non-occluded region but inside the off-road area;

marking all occluded points that are located inside the off-road area and that are located within a predetermined distance from each plurality of virtual field-of-view lines to identify a fully occluded region; and controlling the host vehicle using the occlusion map includes controlling the host vehicle using the fully occluded region.

8. A system for generating an occlusion map using crowd-sourcing, comprising:

a remote server including a server controller;

wherein the server controller is programmed to:

receive occlusion data from a host vehicle, wherein the host vehicle includes at least one sensor, the at least one sensor is configured to detect a plurality of dynamic objects, the occlusion data includes a plurality of virtual detection lines each extending from the at least one sensor of the host vehicle to the one of the plurality of dynamic objects detected by the at least one sensor, and each of the plurality of virtual detection lines intersects an off-road area;

mark all non-occluded points that are located inside the off-road area and that are located within a predetermined distance from each plurality of virtual detection lines; and determine a non-occluded region inside the off-road area using the non-occluded points that have been previously marked inside the off-road area, wherein the non-occluded region is part of non-occlusion data;

generate an occlusion map using the non-occlusion data; and transmit the occlusion map to the host vehicle.

9. The system of claim 8, wherein the server controller is programmed to:

control the host vehicle using the occlusion map; and wherein the server controller is configured to create rectangles for each of the plurality of virtual detection lines by expanding a width of each of the plurality of virtual detection lines by a predetermined width value.

10. The system of claim 8, wherein the occlusion data includes temporal classification data, wherein the temporal classification data includes information about occlusion observations by the at least one sensor of each of the host vehicle divided into segments of time.

11. The system of claim 8, wherein the occlusion data includes sensor classification data, wherein the sensor classification data includes information about sensor modality, sensor mounting orientation, and sensor mounting height.

12. The system of claim 8, wherein the remote server is located remotely relative to the host vehicle.

13. The system of claim 8, wherein the server controller is configured to determine the non-occluded region inside the off-road area using the non-occluded points that have been previously marked inside the off-road area periodically at predetermined time intervals.

14. The system of claim 9, further comprising:

a host vehicle in communication with the remote server, wherein the host vehicle includes a vehicle controller configured to:

receive the occlusion map from the remote server;

project a plurality of virtual field-of-view lines that span a nominal field of view of the at least one sensor in a navigational map;

determine whether one or more of the virtual field-of-view lines passes through an occluded off-road region, wherein the occluded off-road region is outside the non-occluded region but inside the off-road area;

mark all occluded points that are located inside the off-road area and that are located within a predetermined distance from each plurality of virtual field-of-view lines to identify a fully occluded region; and control the host vehicle using the occlusion map includes controlling the host vehicle based on the fully occluded region.

\* \* \* \* \*